Jan. 5, 1926.

E. A. KUEN 1,568,283

METHOD OF MAKING REFLECTORS

Filed August 21, 1923  2 Sheets-Sheet 1

INVENTOR
Eugene A. Kuen
BY Thornton Bogert
ATTORNEY

Jan. 5, 1926.
E. A. KUEN
1,568,283
METHOD OF MAKING REFLECTORS
Filed August 21, 1923   2 Sheets-Sheet 2
FIG. 5
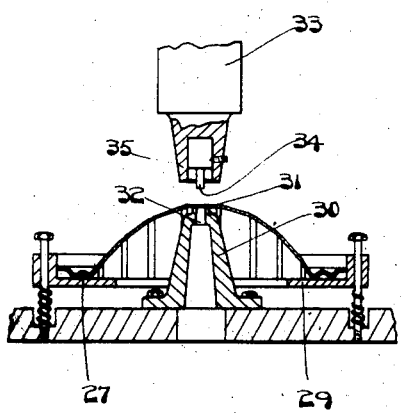
FIG. 6
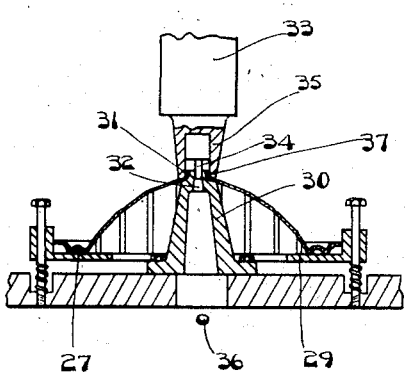
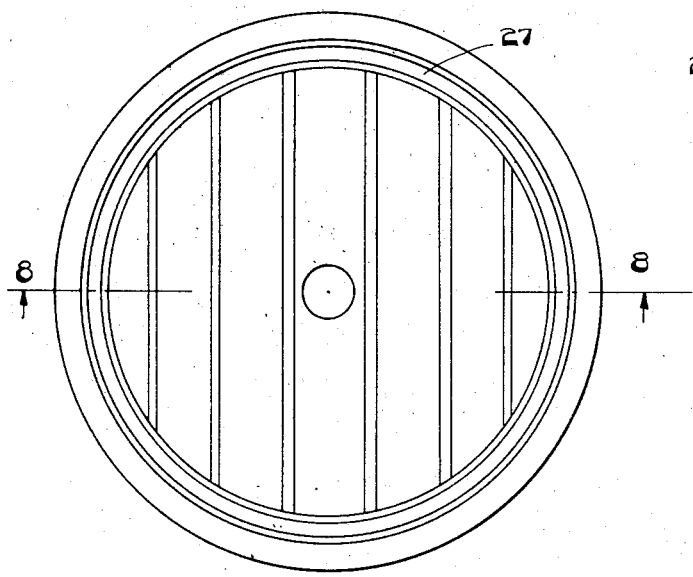
FIG. 7
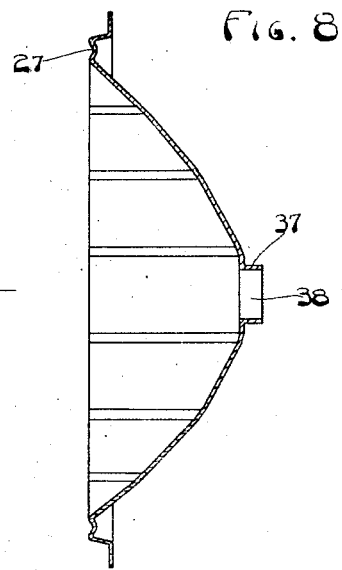
FIG. 8
INVENTOR
Eugene A. Kuen
BY
Thornton Bogert
ATTORNEY Patented Jan. 5, 1926.                                                      1,568,283

UNITED STATES PATENT OFFICE.

EUGENE A. KUEN, OF CINCINNATI, OHIO, ASSIGNOR, BY MESNE ASSIGNMENTS, TO THE AMERICAN FLATLITE COMPANY, OF CINCINNATI, OHIO, A CORPORATION OF OHIO.

METHOD OF MAKING REFLECTORS.

Application filed August 21, 1923. Serial No. 658,649.

*To all whom it may concern:*

Be it known that I, EUGENE A. KUEN, a citizen of the United States, residing at Cincinnati, in the county of Hamilton and State of Ohio, have invented a new and useful Method of Making Reflectors, of which the following is a specification.

The methods heretofore used in the making of reflectors such as are employed in the usual automobile headlamps, have been confined principally to two methods. In one instance the method consists in drawing the material into a die by means of a punch, the die and punch being designed to press the material into the required shape between them. In the other instance the material is stretched over a draw punch to produce the required shape somewhat as shown in my Patent No. 1,294,486 issued to me upon Feb. 18, 1919. This patent refers to a method of producing a reflector of laminated construction by stretching the laminæ into one another. In the invention which I am about to describe I employ a method of stretching, but contemplate its use in the formation of especially formed reflectors of single layer as well as of laminated construction.

The reflector which I produce by this stretching method is of the type which has been developed following the requirements of municipalities and States, designed to regulate the lighting of roadways by motor vehicles. This type of reflector consists in a structure having a basic curvature of concave outline, upon or within which configurations of various designs are formed for producing the required legal light patterns which will come within the laws.

An object of my invention is a method of producing partially or wholly configurated reflectors in a manner such that greater accuracy and uniformity of results is obtained than has heretofore been possible.

A further object is a method which materially reduces the cost of production, both in the tools required and in their accurate alignment relatively to one another.

These and other objects are attained in the method described in the following specification and illustrated in the accompanying drawing, in which:

Fig. 5 is a view showing the suitable tools and the reflector arranged for the third and final step in the completion of a reflector made in accordance with my invention; and Fig. 6 is a view of the same apparatus as illustrated in Fig. 5, but showing the completed reflector resulting from the disclosed operation of the apparatus.

Fig. 7 is a front elevational view of a configurated reflector produced in accordance with my invention.

Fig. 8 is a sectional view of the reflector shown in Fig. 7, taken on the line 8—8 thereof.

Figure 1:
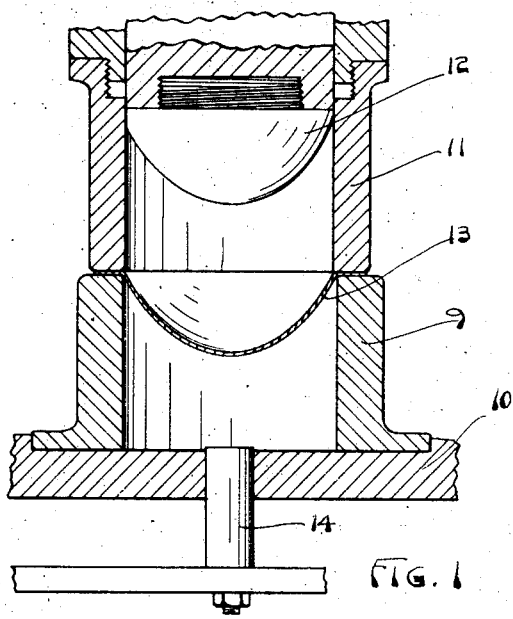
Fig. 1 is a fragmental sectional eleva-tion of apparatus employed in the carrying out of my improved method, the first step being shown in the production of a reflector thereby.

In the first step required to produce reflectors by my improved method I employ an annular blank supporting member 9 which is located on the bed 10 of the press. Upon this member the blank from which the reflector is to be produced is supported. Above the member 9 a blank holder 11 reciprocates and a draw punch 12 reciprocates within the blank holder, both, as in the usual press operation. A blank having been placed on annular member 9, the blank holder moves into sufficiently snug engagement therewith to permit the edges of the blank to be pulled from between it and the annular member 9 as the draw punch 12 moves downwardly upon the blank to draw it substantially into the shape of the basic curvature or embryonic reflector 13 from which the finished product is to be produced. Having drawn the blank into the shape 13, the draw punch and blank holder are successively withdrawn and the usual knockout 14 is brought upwardly to lift the shape 13 from the annular element, from which it may now be removed.

Figure 2:
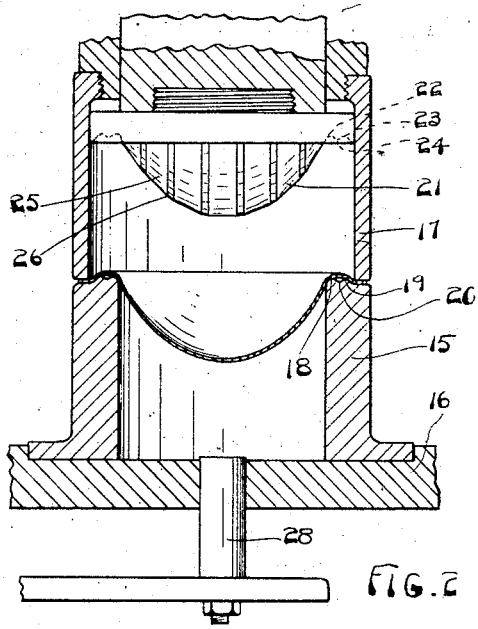
Fig. 2 is a view similar to Fig. 1, but showing the apparatus arranged for the carrying out of the second step of my improved method.
Figure 3:
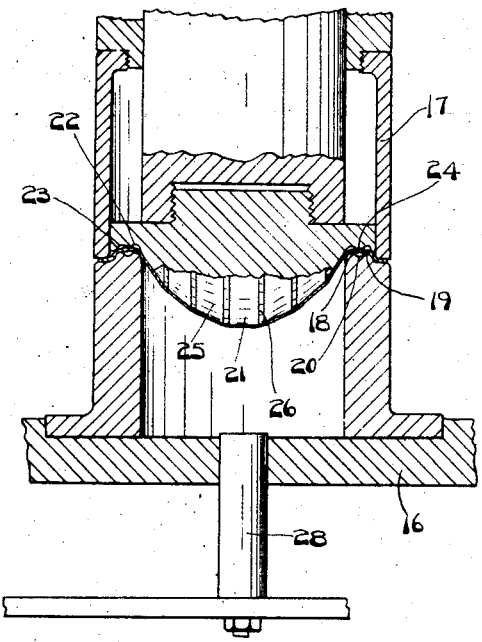
Fig. 3 is a view similar to Fig. 2, but showing the second step partially completed.
Figure 4:
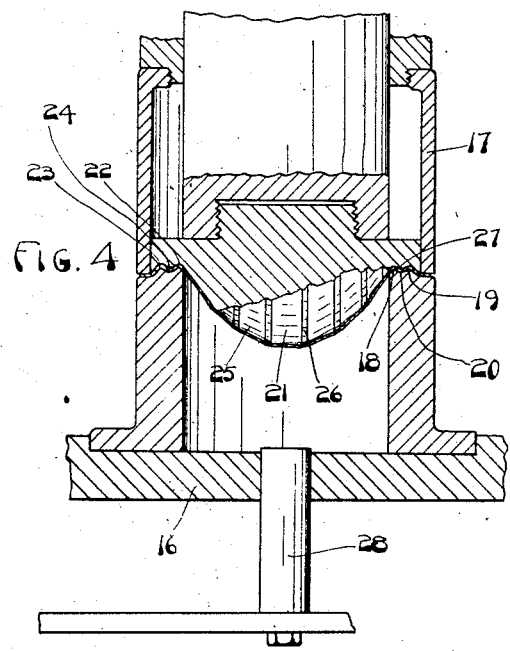
Fig. 4 is a view showing the completed or second step operation.

The embryonic reflector, in the second step of its manufacture, is now placed in a press having a die 15 located on the bed 16 thereof. This die is provided with concentric ridges 18 and 19 between which is a groove 20. Within the reflector holder 17 a special draw punch 21 is reciprocally mounted. The outer edge of this punch is provided with a rim which is so shaped as to cooperate with the groove and ridges of die 15, being provided with two grooves 22 and 23 and a ridge 24. The punch is different from the draw punch 12 in that the contour is shaped to that which the finished reflector is to take. In the punch I have shown, the surface is broken up into a series of substantially flat, convex or concave wide stripes 25 and narrow stripes 26, this, however, being but exemplary of one form of reflector of the type to which this invention refers. With the generic reflector located in the die 15 the holder 17 is moved downwardly to press the rim of the reflector into the position shown in Fig. 2, the draw punch now being moved downwardly and into contact with the reflector to stretch its surface over the corners of the punch as shown in Fig. 3. The ridges of the punch rim and the die are, at this stage of the second step of my improved method, brought to the point of just touching the annular portion of the reflector beyond the central portion. The continued downward movement of the punch will press the material of the reflector rim into the grooved shape 27 shown in Fig. 4 and simultaneously give the reflector the slight additional stretch necessary to give it a set sufficient to prevent return to an inaccurate configuration. Having completed this second and principal stage of the invention, the knock-out 28 will lift out the reflector upon withdrawal of the punch 21 and holder 17.

The final operation necessary to place the reflector in operative condition is shown in Figs. 5 and 6. This operation is for the purpose of providing for the reception of the means for illumination, as for example, an electric bulb, although other sources of illumination may be provided. The operation I will now describe is for electric bulb installation and is merely an incidental operation which is not essential to the completion of the feature of novelty of this improved method. I have provided a floating or yieldingly mounted platform 29 which surrounds a centrally located combined die and draw punch 30 having a protuberance 31 in which a passage 32 is provided, a reflector, when placed in the position shown in Fig. 5, having the protuberance located substantially axially thereof. Cooperating with die 30 a combined die and draw punch 33 is provided, the punch pin 34 being adapted to enter passage 32 and die 35 being adapted to cooperate with protuberance 31. In its operation the punch 34 will first remove a punching 36 from the reflector, as shown in Fig. 6. The continued downward movement of the die 35 will then force the material surrounding the opening produced by punch 34 to open or expand about the protuberance 31 and produce a flange 37 surrounding an enlarged opening 38 which will receive the connector for mounting the electric bulb. Thus the finished product, as disclosed in Figs. 7 and 8, is produced.

I have experimented with all materials including metals of different kinds as well as glass, and find that the configurating method I have just described is successful regardless of the material employed. In the use of glass I find that it can be quite satisfactorily stretched into configurated form by the identical method I have described herein, it being but necessary to work it while in a plastic condition and upon heated dies and draw punches.

I have also found that the successful drawing or stretching of the reflector material to produce the corners or angles of the reflector configurations, depends somewhat upon the configuration of the punch. Some materials require a more vigorous bending action at the edges of the configurations during the stretching operation, because of the spring-like tendency of the material. This requires a sharper angular formation to produce the required set in the metal at the edges of the configurations. Also I have found that by the method I have just described I may as readily produce stripes or configurations of any shape or size at any place upon the reflector and may also so shape them that they are of flat, concave or convex cross section transversely, or a combination of flat and convex or concave, or of concave and convex combination either in the same stripe or in adjacent stripes, the whole principle which is involved, being that of regulating the degree of stretch and the angle between the configurations in accordance with the characteristics of the material being manipulated and the configurated design to be produced.

It is also known that sheet metal produces a certain grain which extends in one direction throughout the sheet. I have found that for certain purposes it is best to place the sheet metal blank in the dies in such a manner that the grain extends transversely to the general direction of the stripes. This is particularly true when it is desired to produce a reflector from unusually thin or easily cracked sheet metal, the advantage obtained in this instance being that there is much less tendency for the metal to crack when stretched across the ridges of the draw punch. At times however, I have found that by placing the blank in a direction such that the grain is in alignment with the stripes of the draw punch, the drawing of the desired transverse curvature is greatly facilitated.

Having thus described my invention what I claim is:

1. A method of making reflectors consisting in forming a reflector shell of basic contour, and then stretching the basic contour into configurations by subjecting portions of one side of the reflector to sufficient pressure to stretch the material thereof into configurations without supporting the opposite side during the stretching operation.

2. A method of making reflectors consisting in forming a reflector shell of basic contour, and then stretching the basic contour on one side on points or lines so spaced as to produce configurations, without supporting the opposite side during the stretching operation.

3. A method of making reflectors consisting in forming a reflector shell of basic contour, holding the edge of the shell and then subjecting one side of the shell within the edge to a stretching operation on points or lines so spaced as to produce configurations, without supporting the opposite side during the stretching operation.

4. A method of making reflectors consisting in forming a reflector shell of basic contour, holding the edges of the shell and then subjecting one side of the shell within the edge to a stretching operation along the lines describing the bounding edges of the configurations to be formed therein.

5. A method of making reflectors consisting in forming a reflector shell of basic contour, holding the edges of the shell and then subjecting one side of the shell within the edge to a stretching operation along the lines describing the bounding edges of the configurations to be formed therein, without supporting the opposite side thereof.

6. The method of forming configurated reflectors, from a preformed bowl-shaped shell having a marginal flange, which consists in rigidly clamping the flange with the bowl portion unsupported and stretching the unsupported portion of the metal by the pressure of a configurated die applied to the inner surface of the bowl and while the margin is held to prevent the metal from drawing.

7. The method of forming a series of relatively flattened surfaces in a bowl-shaped reflector having a marginal rim flange, which consists in rigidly clamping an edge portion of the flange with the bowl projected into space, subjecting the unsupported portion of the metal to the pressure of a configurated die applied to the inner surface of the bowl with the outer surface unsupported and while the marginal edge is held to prevent the metal from drawing, and stretching the metal until the bowl surface is distorted into a series of surfaces dominated by the configurations of the die.

8. The method of forming bowl-shaped configurated reflectors, which consists in tensionally engaging the opposite surfaces of the marginal portion of the blank for a drawing action of the metal while the medial portion of the blank is unsupported, drawing the metal into a bowl shape by the pressure of a forming die applied upon one side of the blank while unsupported upon the opposite side, and forming a flange at the marginal portions by the drawing action, and then rigidly clamping the marginal flange with the bowl portion projected into space, stretching the unsupported portion of the metal by the pressure of a configurated die applied to the inner surface of the bowl while the outer surface is unsupported and while the margin is held to prevent the metal from drawing.

EUGENE A. KUEN.